United States Patent [19]
Hirata et al.

[11] Patent Number: 5,963,550
[45] Date of Patent: Oct. 5, 1999

[54] PACKET TRANSFER SCHEME AND MOBILE COMMUNICATION SYSTEM

[75] Inventors: Shoichi Hirata, Higashiyamato; Masumi Sotoyama, Yachiyo; Kimio Ikeda, Warabi; Kazuo Sugiyama, Kashiwa; Atsushi Shimokawa, Tokorozawa; Koji Yamamoto, Sayama; Akihisa Nakajima, Higashimurayama, all of Japan

[73] Assignee: NTT Mobile Communications Network, Inc., Tokyo, Japan

[21] Appl. No.: 08/700,404

[22] PCT Filed: Dec. 28, 1995

[86] PCT No.: PCT/JP95/02753

§ 371 Date: Aug. 29, 1996

§ 102(e) Date: Aug. 29, 1996

[87] PCT Pub. No.: WO96/21328

PCT Pub. Date: Jul. 11, 1996

[30]    Foreign Application Priority Data

Jan. 6, 1995 [JP] Japan .................................... 7-000819
Jan. 6, 1995 [JP] Japan .................................... 7-000820

[51] Int. Cl.[6] .................................................. H04L 12/56
[52] U.S. Cl. .......................................... 370/349; 455/456
[58] Field of Search ..................................... 455/456, 466, 455/440, 457, 422, 428, 432, 435, 433, 436, 437, 438, 439, 560; 370/338, 329, 352, 389, 331, 386, 349; 375/356

[56]           References Cited

U.S. PATENT DOCUMENTS

| 5,327,144 | 7/1994 | Stilp et al. | 455/404 |
|---|---|---|---|
| 5,438,609 | 8/1995 | Yahagi | 455/456 |
| 5,504,804 | 4/1996 | Widmark et al. | 455/414 |
| 5,561,840 | 10/1996 | Alvesalo et al. | 455/433 |
| 5,570,412 | 10/1996 | LeBlanc | 455/456 |
| 5,579,375 | 11/1996 | Ginter | 455/417 |
| 5,619,552 | 4/1997 | Karppanen | 455/433 |
| 5,711,002 | 1/1998 | Foli | 455/433 |

FOREIGN PATENT DOCUMENTS

| 0619686 | 10/1994 | European Pat. Off. . |
|---|---|---|
| WO94/17644 | 8/1994 | Japan . |
| WO 95 28063 | 10/1995 | Japan . |

OTHER PUBLICATIONS

Inter–Network Roaming Based on Personal Digital Cellular Standards, H. Sawada et al., Proceedings of the Global Telecommunications Conference (GLOBCOM), Houston, Nov. 29–Dec. 2, 1993, vol. 3 of 4, Institute of Electrical and Electronics Engineers, pp. 1944–1949, 1993.

On the Voice–Data Integration in Third Generation Wireless Access Communication Networks, M. Paterakis, et al., European Transactions on Telecommunications and Related Technologies, vol. 5, No. 1, pp. 11–18, 1994.

Design Study for a CDMA–Based Third–Generation Mobile Radio System, A. Baier et al., IEEE Journal on Selected Areas in Communications, vol. 12, No. 4, pp. 733–743, 1994.

*Primary Examiner*—Chau Nguyen
*Assistant Examiner*—Kenneth Vanderpaye
*Attorney, Agent, or Firm*—Brinks Hofer Gilson & Lione

[57]           ABSTRACT

In order to provide a packet transfer scheme in which various data can easily be used commonly with other communication methods and a packet can be transferred at a high speed, a mobile communication system comprises a database (20) for storing an identification number of a mobile terminal (40) and location information indicating a zone in which the mobile terminal is currently located, a packet switch (10), and another packet switch (30) capable of communication when the mobile terminal (40) is located in a zone under the packet switch (30). The packet switch (10) inquires of the database (20) about the location information of the mobile terminal (40) when the packet switch (10) receives a packet addressed to the mobile terminal (40). When the mobile terminal (40) is located in the zone under the packet switch (30), the packet is transferred to the mobile terminal (40) through the packet switch (30). Owing to this arrangement, the number of packet switches necessary for transferring the packet to the mobile terminal is two at the most. Thus, the packet can be transferred rapidly.

6 Claims, 14 Drawing Sheets

CONVENTIONAL NETWORK CONSTRUCTION

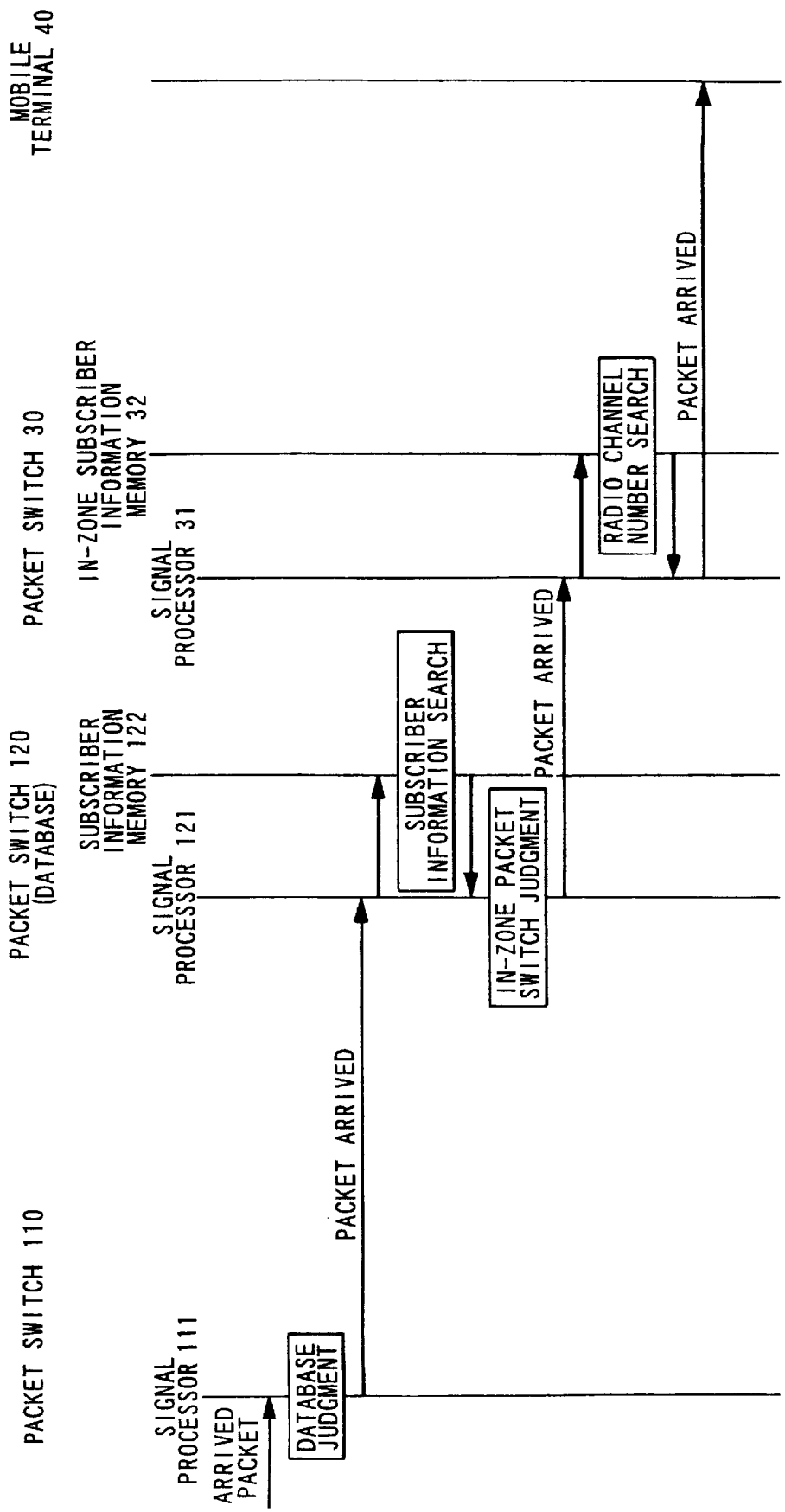

5,963,550

PACKET TRANSFER SCHEME AND MOBILE COMMUNICATION SYSTEM

TECHNICAL FIELD

This invention relates to a packet transfer scheme for transferring a packet at a high speed in a mobile communication and a packet mobile communication system using this transfer scheme.

BACKGROUND ART

FIG. 13 shows a construction of a conventional packet communication network in a mobile communication, and FIG. 14 shows a control sequence diagram employed in this construction.

In FIG. 13, a packet switch 110 includes a signal processor 111. This signal processor 111 is interconnected with an external packet switch (for example, a packet switch in an integrated services digital network [ISDN]). Upon receipt of a packet addressed to one of the mobile terminals within the network, the signal processor 111 transfers the packet to a packet switch 120. This packet switch 120 includes a subscriber information memory 122 in which subscribers information of the individual mobile terminals is stored. The subscriber information includes identification numbers of the individual mobile terminals, service information indicating the contents of services (for example, whether the individual mobile terminals subscribe to the packet service or not) for the individual mobile terminals, location information showing the zones where the individual mobile terminals are currently located.

The signal processor 121 included in the packet switch 120 reads the subscriber information of the mobile terminal 40 as the address of the packet from the subscriber information memory 122 and makes a judgment as to whether or not a service can be offered to the mobile terminal 40, based on the service information stored in the subscriber information memory 122. If the judgment result is affirmative, the signal processor 121 transfers the packet to a packet switch 30 corresponding to the zone shown in the location information. Although FIG. 13 shows only one packet switch 30, actually, a number of similar packet switches are installed and administrate their own zones, respectively.

With the above-mentioned arrangement, however, it was difficult for other communication methods (for example, voice communication method) to commonly use the contents of the subscriber information memory 122 because the subscriber information memory 122 is installed within the packet-specific switch 120. Another problem was that since the packet transferred from the external packet switch must be transferred to the mobile terminal 40 essentially via at least three packet switches, the transmission speed is decreased.

DISCLOSURE OF INVENTION

The present invention was made in view of the above-mentioned problems. It is, therefore, an object of the present invention to provide a packet transfer scheme and a mobile communication system in which various data can easily be used commonly with other communication methods and a packet can be transferred at a high speed.

To achieve this object, from one aspect of the present invention, there is provided packet transfer scheme used in a mobile communication system comprising a database for storing an identification number of a mobile terminal and location information showing a zone in which the mobile terminal is currently located and for rewriting the location information in accordance with a request from the mobile terminal, a first packet switch, and a second packet switch capable of communicating with the mobile terminal in case the mobile terminal is located in a zone under the second packet switch, the packet transfer scheme being characterized in that:

the first packet switch inquires of the database about the location information when the first packet switch receives a packet addressed to the mobile terminal;

the database provides the first packet switch with the location information in response to the inquiry;

the first packet switch transfers the packet to the second packet switch in case the location information indicates the zone under the second packet switch; and the second packet switch transfers the packet to the mobile terminal when the second packet switch receives the packet from the first packet switch.

With this construction, the first packet switch inquires of the database about location information of a mobile terminal as a destination address of a packet received by the first packet switch. In response to the inquiry, the database provides the location information to the first packet switch. In case this location information indicates a zone under the second packet switch, the first packet switch transfers the packet to the second packet switch which, in turn, transfers the packet to the mobile terminal.

Accordingly, the number of packet switches necessary for transferring the packet is two at the most. Thus, the packet can be transferred rapidly.

Moreover, since the database is installed separately from the packet switch, various data can be used commonly with other communication methods.

In order to transfer a packet at a higher speed, from a second aspect of the present invention, the packet transfer scheme being characterized in that:

said first packet switch includes temporary storage means having a higher access speed than said database; and when said first packet switch receives the location information from said database, said first packet switch writes the location information in said temporary storage means, and when said first packet switch receives again the packet addressed to said mobile terminal after said first packet switch receives the packet, said first packet switch reads the location information from said temporary storage means and transfers the packet to said second packet switch.

With this construction, upon receipt of the first packet addressed to a mobile terminal, the first packet switch inquires of the database about location information of the mobile terminal. In response to the inquiry, the database provides the location to the first packet switch. Then, the first packet switch stores the location information in a temporary storage means. At the same time, the first packet switch is transferred to the second packet switch in case the location information indicates a predetermined zone (zone under the control of the second packet switch). When the first packet switch receives a second packet addressed to the same mobile terminal after it received the first packet, the first packet switch reads the location information from the temporary storage means and transfers the second packet to the second packet switch.

Therefore, according to the packet transfer scheme of the present invention, the location information of a mobile terminal is read at a high speed from a temporary storage means included in the first packet switch. As a consequence, packets can be transferred at a high speed and loads applicable to the database can be reduced.

BRIEF DESCRIPTION OF DRAWINGS

FIG. 14 is a control sequence diagram of the conventional packet communication network.

BEST MODE FOR CARRYING OUT THE INVENTION

Several best modes for carrying out the present invention will now be described with reference to the drawings.
(First Mode)

Figure 1:
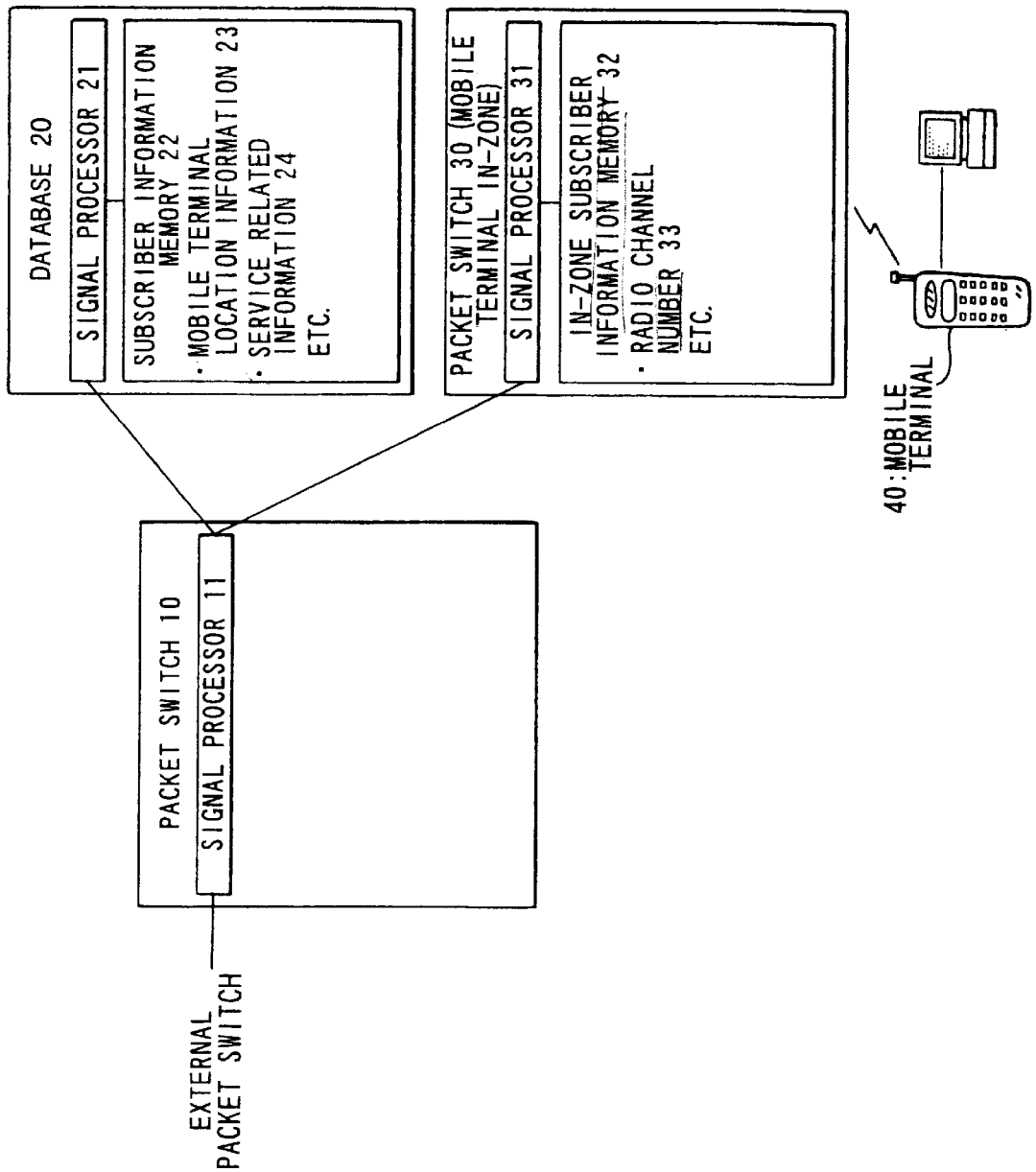
FIG. 1 is a block diagram showing a construction of a packet communication network according to the first mode for carrying out the present invention.
Figure 13:
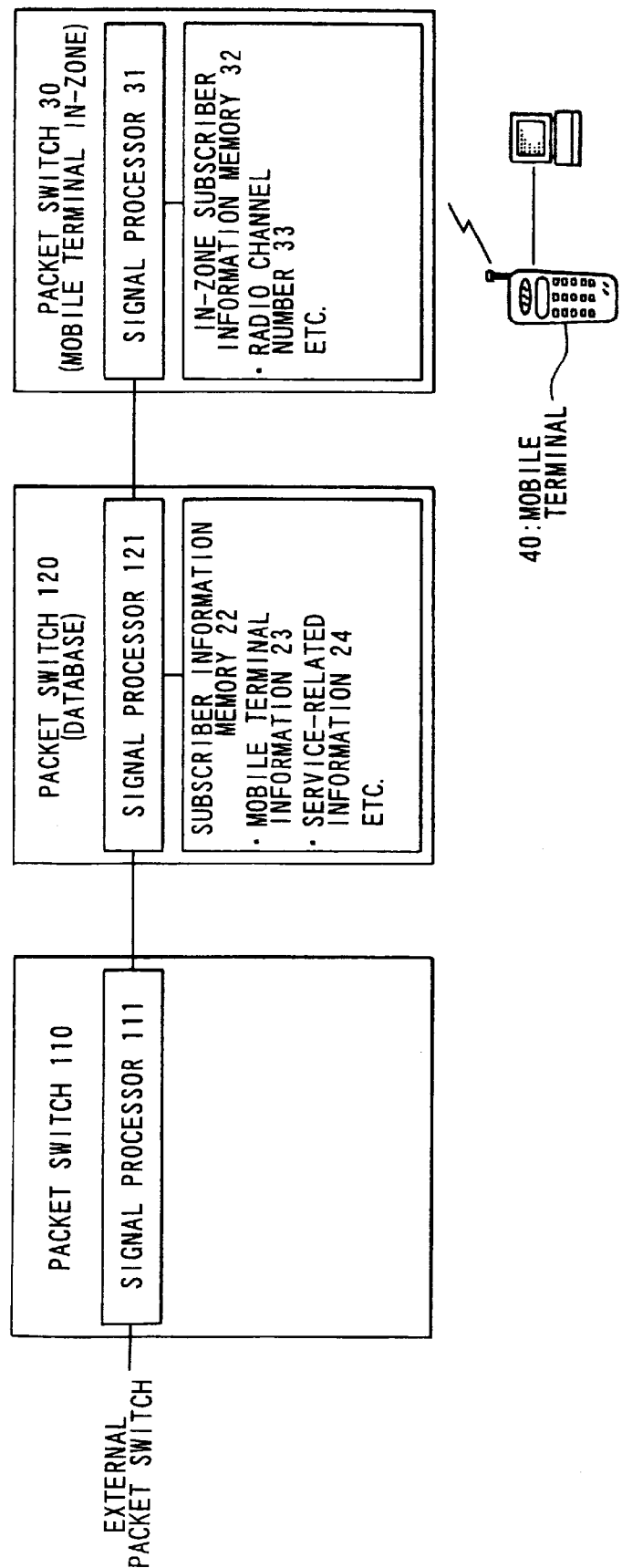
FIG. 13 is a block diagram showing a construction of a conventional packet communication network.

First, the first mode for carrying out the present invention will be described. FIG. 1 is a block diagram showing a construction of a packet communication network according to the present invention. In FIG. 1, like parts of FIG. 13 are denoted by like reference numerals respectively and description thereof is omitted.

In FIG. 1, a mobile terminal 40 is located in a zone which is under the control of a packet switch 30. A radio channel assigned to the mobile terminal 40 is stored in an in-zone subscriber information memory 32 installed in the packet switch 30.

Reference numeral 20 denotes a database having a subscriber information memory 22. Subscriber information is stored in this subscriber information memory 22. As previously noted, the subscriber information includes an identification number of each mobile terminal, service information indicating the contents of services for the individual mobile terminals, and location information indicating the zone in which the individual mobile terminals are located.

Reference numeral 10 denotes a packet switch including a signal processor 11. When the signal processor 11 receives a packet addressed to the mobile terminal 40 from an external packet switch, the signal processor 11 outputs a read request command to the database 20 in order to read the subscriber information relating to the mobile terminal 40.

Reference numeral 21 denotes a signal processor installed within the database 20. Upon receipt of the read request command, the signal processor 21 reads the subscriber information of the mobile terminal 40 from the subscriber information memory 22 and provides the signal processor 11 with the subscriber information thus read, in response to the request. The signal processor 11 makes a judgment as to whether or not the mobile terminal 40 can perform a communication, based on the service information included in the received subscriber information. The signal processor 11 also makes a judgment as to what packet switch controls the zone in which the mobile terminal 40 is located.

Here, in case the mobile terminal 40 is located in the zone controlled by the packet switch 10, the mobile terminal 40 transfers the packet directly to the mobile terminal 40. In case the mobile terminal 40 is located in a zone controlled by other packet switches (packet switch 30, etc.), the signal processor 11 transfers the packet to that packet switch.

Reference numeral 31 is a signal processor installed within the packet switch 30. Upon receipt of the packet, the signal processor reads a radio channel of the mobile terminal 40 from the in-zone subscriber information memory 32 and transfers the packet to the mobile terminal 40 through the radio channel.

Operation of the first mode for carrying out the invention will now be described.

When the mobile terminal 40 is located in the zone controlled by the packet switch 30, the mobile terminal 40 sends a location registration request to the packet switch 30. In case the location registration request is possible to perform, the packet switch 30 performs the location registration. Then, the packet switch 30 records a radio channel used by the mobile terminal 40 in the in-zone subscriber information memory 32. Further, the packet switch 30 informs the database 20 that the location of the mobile terminal 40 was registered. By this, in the database 20, the location information of the mobile terminal 40 is renewed.

Figure 2:
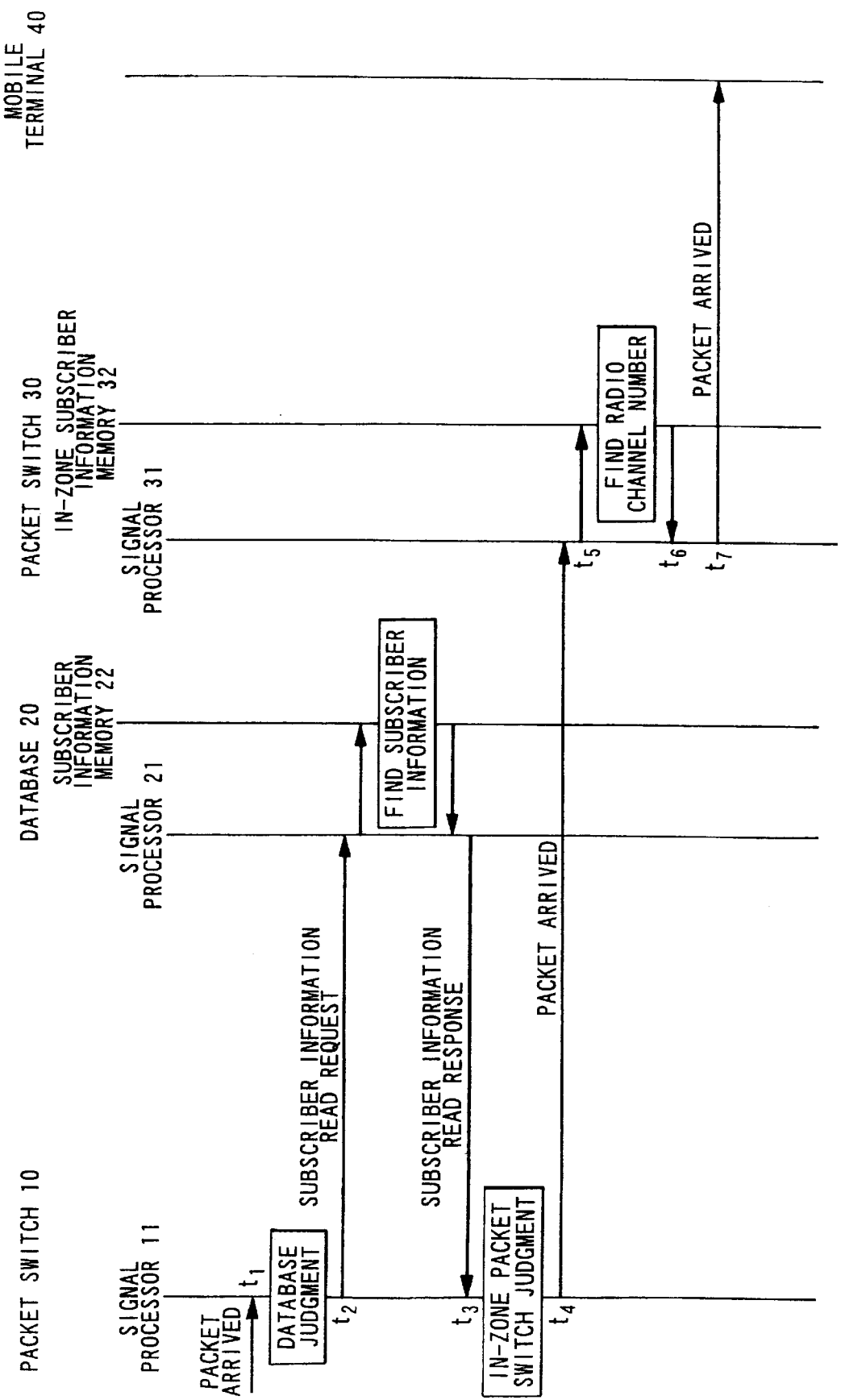
FIG. 2 is a control sequence diagram relating to the first mode for carrying out the invention.

That is, it is registered as the location information that the mobile terminal 40 is located in the zone controlled by the packet switch 30. Next, operation is described with reference to FIG. 2. First, at time $t_1$, a packet addressed to the mobile terminal 40 is transferred to the signal processor 11. At time $t_2$, the signal processor 11 sends a read request command to the signal processor 21. The signal processor 21 reads the subscriber information of the mobile terminal 40 from the subscriber information memory 22 and returns the subscriber information thus read to the signal processor 11 at time $t_3$.

In the signal processor 11, a judgment is made as to whether or not the mobile terminal 40 can perform a packet communication, based on the subscriber information returned. For example, if the service information included in the subscriber information indicates "the packet service is not available", it is impossible for the mobile terminal 40 to perform the communication. Accordingly, the signal processor 11 informs the sender of the packet of that effect. Let us presume here that the packet communication is available for the mobile terminal 40.

Then, in the signal processor 11, a judgment is made as to what packet switch the packet should be transferred, based on the location information included in the subscriber information. In the above example, it is judged that the packet should be transferred to the packet switch 30. Based on this judgment, at time $t_4$, the packet is transferred to the packet switch 30.

Then, in the packet switch 30, the signal processor 31 begins to find the radio channel of the mobile terminal 40 located in the zone (time $t_5$), and the radio channel is found at time $t_6$. Based on this, at time $t_7$, the packet is transferred to the mobile terminal 40 from the packet switch 30 through the radio channel thus found.

When the mobile terminal 40 moves to the zone controlled by the packet switch 10, the mobile terminal 40 sends a location registration request to the packet switch 10. The packet switch 10 performs the location registration when the location registration is allowed. Then, the mobile terminal 40 records the radio channel to be used in a in-zone subscriber information memory (not shown). Further, the packet switch 10 informs the database 20 that the location registration of the mobile terminal 40 was made. By this, the location information of the mobile terminal 40 is renewed in the database 20. In this way, as the mobile terminal 40 moves, the location information is appropriately renewed in the database and the communication is continued.

In this way, according to the packet communication network of the first mode for carrying out the present invention, since the packet is transferred to the mobile terminal 40 through two packet switches at the most, the packet can be transferred rapidly. Moreover, since the database is installed separately from the packet switch, various data can easily be used commonly with other communication methods.

(Second Mode)

In the first mode for carrying out the invention, the packet transfer speed is improved compared with the conventional packet transfer scheme. It takes a long time (time period from time $t_2$ to $t_3$) for the packet switch 10 to obtain the subscriber information, and the packet cannot be transferred (time $t_4$) during the time period. For this reason, even with the above-mentioned arrangement, it was difficult to say that the transfer speed is high enough. Furthermore, the above-mentioned arrangement still has such a problem that loads tend to concentrate on the database 20. When the database 20 is subjected to excessive load, it takes longer time to transfer the subscriber information to the packet switch 10. As a consequence, the transfer speed of the packet is much lowered.

Figure 3:
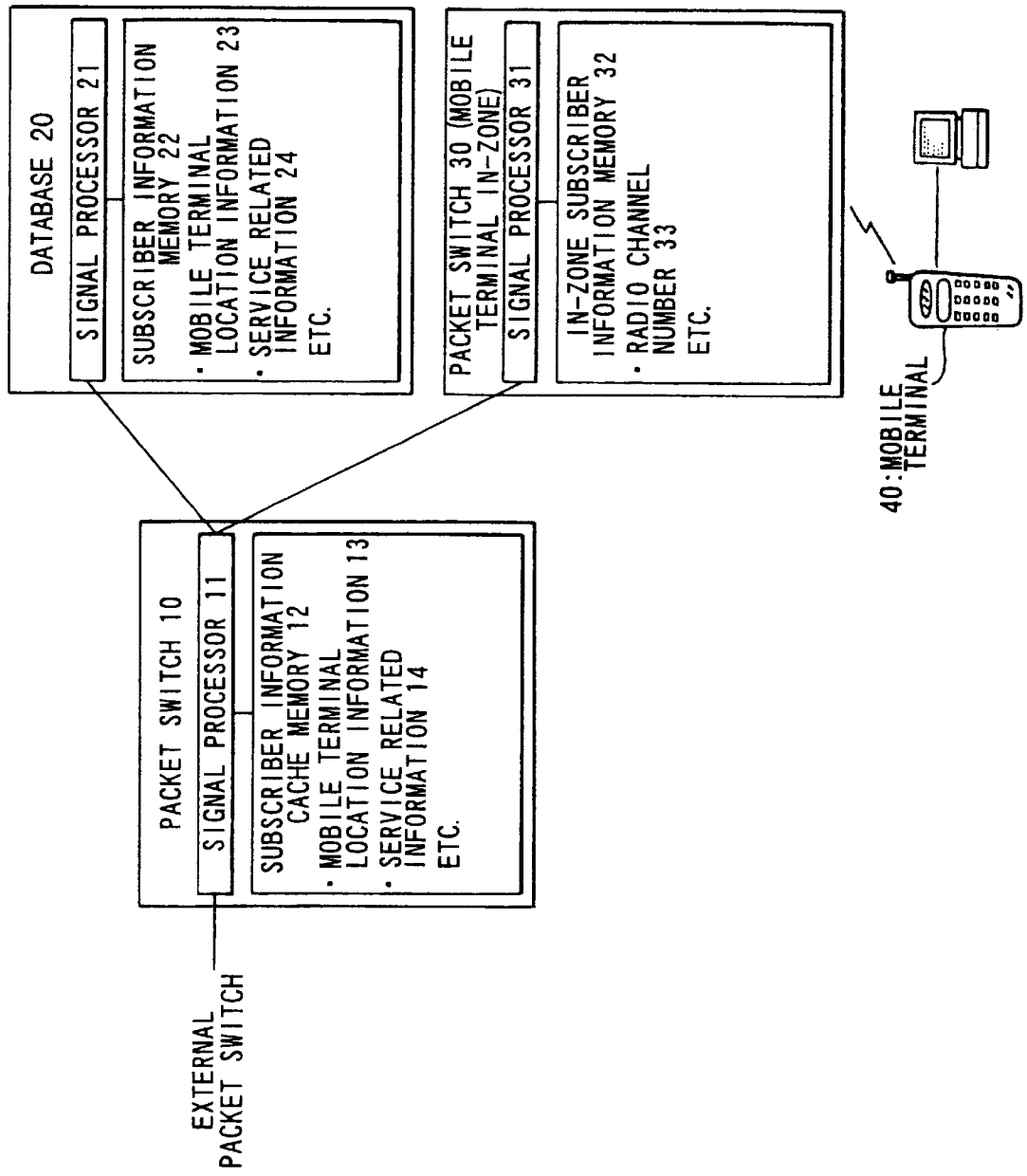
FIG. 3 is a block diagram showing a construction of a packet communication network according to the second mode for carrying out the present invention.
Figure 4:
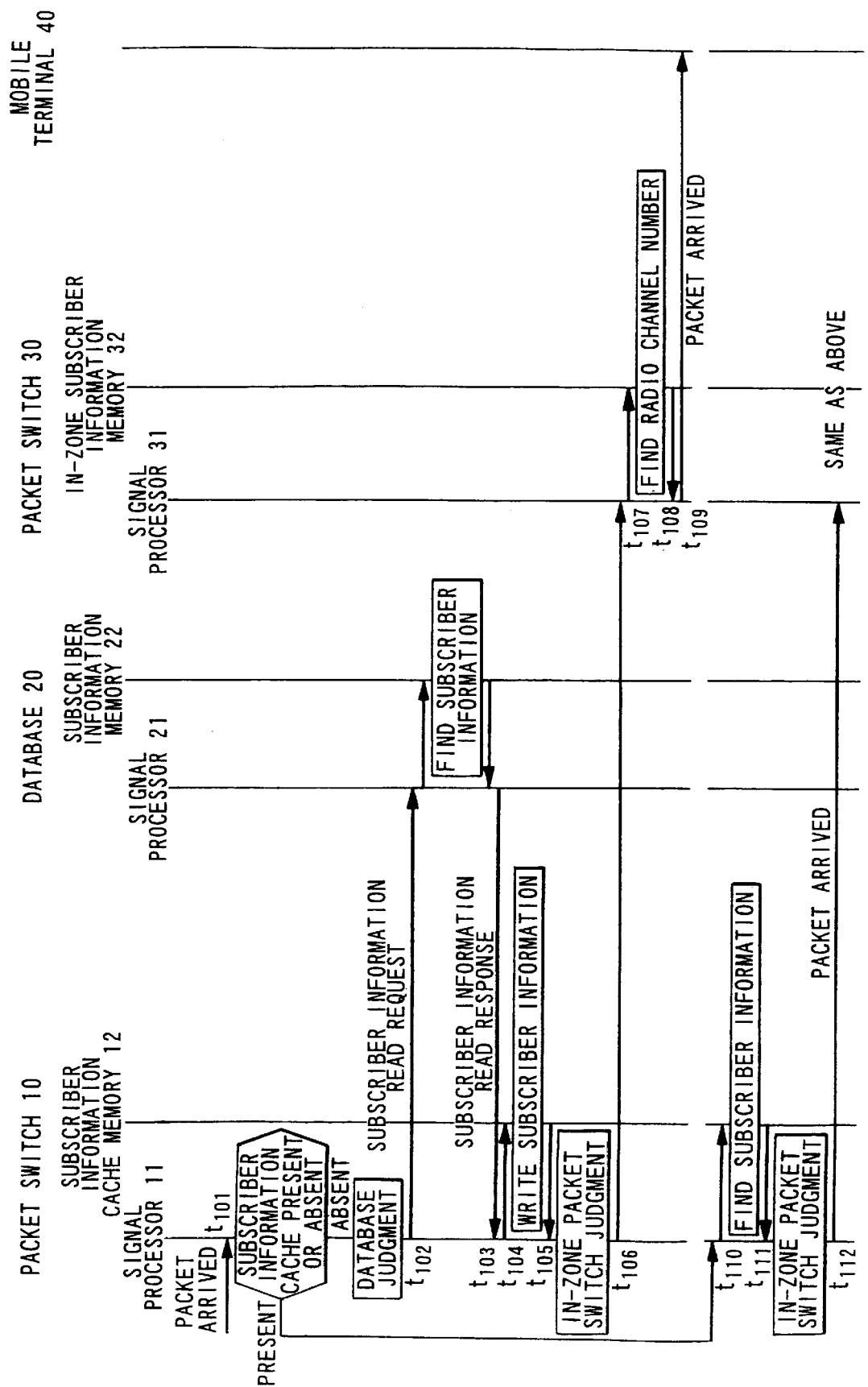
FIG. 4 is a control sequence diagram relating to the second mode for carrying out the invention.

In view of the above, the second mode for carrying out the present invention, which has successively obviated the above problem, will now be described. FIGS. 3 and 4 are block diagrams showing a construction of a packet communication network according to the second mode for carrying out the present invention. In FIGS. 3 and 4, like parts of FIGS. 1, 2, 13 and 14 are denoted by like reference numerals, and description thereof is omitted.

In FIG. 3, the mobile terminal 40 is located in the zone controlled by the packet switch 30. A radio channel assigned to the mobile terminal 40 is stored in the in-zone subscriber information memory 32 installed within the packet switch 30. Within the packet switch 10, reference numeral 12 denotes a subscriber information cache memory in which the location information 13, the service-related information 14 and various other information can temporarily be stored.

A condition required for the subscriber information cache memory 12 is that the access speed is higher than the database. Accordingly, inasmuch as this condition is satisfied, a buffer area assigned to the main memory of the packet switch 10 may be used for the cache memory.

Operation of the second mode for carrying out the invention will now be described.

First, as in the conventional case, when the mobile terminal 40 is located in the zone controlled by the packet switch 30, the mobile terminal 40 sends a location registration request to the packet switch 30. When the location registration is allowed, the packet switch 30 performed the location registration. In this case, the packet switch 30 records the radio channel to be used by the mobile terminal 40 in the in-zone subscriber information memory 32. Further, the packet switch 30 informs the database 20 that the location registration of the mobile terminal 40 was made. By this, the location information of the mobile terminal 40 is renewed in the database 20. By this, in the database 20, the location information of the mobile terminal 40 is renewed.

Next, operation to be performed thereafter will be described with reference to FIG. 4. First, at time $t_{101}$, the packet addressed to the mobile terminal 40 is transferred to the signal processor 11. On the other hand, in the signal processor 11, a judgment is made as to whether or not the subscriber information (location information 13, service-related information 14 and others) of the mobile terminal 40 is stored in the subscriber information cache memory 12. At the time point when the packet switch 10 receives the packet addressed to the mobile terminal 40 first, the subscriber information is not stored in the subscriber information cache memory 12.

Accordingly, at time $t_{102}$, the read request command is transferred from the signal processor 11 to the signal processor 21. The signal processor 21 reads the subscriber information of the mobile terminal 40 from the subscriber information memory 22 and returns the subscriber information thus read to the signal processor 11 at time $t_{103}$.

In the signal processor 11, the mobile terminal 40 judges whether or not a packet communication is possible, based on the returned subscriber information. For example, if the service-related information included in the subscriber information indicates "the packet service is not available", it is impossible for the mobile terminal 40 to perform the communication. Accordingly, the signal processor 11 informs the sender of the packet of that effect. Let us presume here that the packet communication is available for the mobile terminal 40.

Next, during the time period from time $t_{104}$ to $t_{105}$, the signal processor 11 writes the subscriber information in the subscriber information cache memory 12. Then, in the signal processor 11, a judgment is made as to what packet switch the packet should be transferred, based on the location information included in the subscriber information. In the above example, a judgment is made to the effect that the packet should be transferred to the packet switch 30. Based on this judgment, at time $t_{106}$, the packet is transferred to the packet switch 30.

In FIG. 4, the write operation made to the cache memory 12 during the time period from time $t_{104}$ to $t_{105}$ and the transfer operation of the packet made at time $t_{106}$ are sequentially performed. However, actually, they may be performed in parallel.

Then, in the packet switch 30, the signal processor 31 begins to find the radio channel of the mobile terminal 40 of the in-zone subscriber (time $t_{107}$). The radio channel is found at time $t_{108}$. Based on this, at time $t_{109}$, the packet is transferred from the packet switch 30 to the mobile terminal 40 through the radio channel thus found.

As a result of the above-mentioned sequential procedures, the first packet addressed to the mobile terminal 40 is transferred to the mobile terminal 40. However, in general, when data transmission is performed, a plurality of packets are transferred one after another. Therefore, presuming a case where a plurality of packets are to be transferred as just mentioned, a control sequence for transferring from the second packet on will be described. When the second packet is transferred to the packet switch 10, as in the case at time $t_{101}$, a judgment is made as to whether or not the subscriber information of the mobile terminal 40 is stored in the subscriber information cache memory 12.

Since the subscriber information of the mobile terminal 40 is already written in the subscriber information cache memory 12 during the time period from time $t_{104}$ to $t_{105}$ as mentioned, a judgment is made here in the affirmative and the procedures from time $t_{110}$ afterwards are performed. That is, at time $t_{110}$, the subscriber information cache memory 12 is searched, and at time $t_{111}$, the subscriber information of the mobile terminal 40 is read by the signal processor 11. Then, in the signal processor 11, a judgment is made as to what packet switch the packet should be transferred, based on the location information included in the subscriber information. In the above example, a judgment is made to the effect that the packet should be transferred to the packet switch 30. Based of this judgment, the packet is transferred to the packet switch 30 at time $t_{112}$.

The operation of the packet switch 30 afterwards from that time is the same as time $t_{107}$ to $t_{109}$. That is, the signal processor 31 finds the radio channel of the in-zone subscriber mobile terminal 40. Then, the packet is transferred from the packet switch 30 to the mobile terminal 40 through the radio channel. The packets after the third packet on are also transferred in the same manner as the second packet. That is, every time one packet addressed to the mobile terminal 40 is transferred to the signal processor 11, the subscriber information cache memory 12 is searched and the packet switch (packet switch 30 in the above example), which should transfer the packet, is specified.

The subscriber information of other mobile terminals (not shown) is also gradually stored in the subscriber information cache memory 12. However, because of limitation of the storage capacity of the subscriber information cache memory 12, the subscriber information is gradually discarded first from one which was not referred to for the longest time. When a packet corresponding to the discarded subscriber information is transferred to the signal processor 11, the signal processor 11 outputs a read request command to the database 20 and the subscriber information is supplied from the database 20 to the signal processor 11.

As described hereinbefore, according to the second mode for carrying out the invention, when the first packet addressed to the mobile terminal 40 is transferred to the packet switch 10 first, the subscriber information is found from the database 20. The subscriber information thus found is written in the subscriber information cache memory 12, and the subscriber information cache memory 12 is searched for the packets from that time afterwards.

Here, since the database 20 is connected to the packet switch 10 through a communication line, there is a limit in information transfer speed. On the other hand, since the subscriber information cache memory 12 is installed within the packet switch 10, the signal processor 11 can access the subscriber information cache memory 12 at a high speed. Moreover, since the number of subscriber information stored in the subscriber information cache memory 12, is much smaller than that in the database 20, the time requires for finding is also decreased.

For this reason, the signal processor 11 can extremely rapidly obtain the subscriber information for the packets from the second packet on, and the packet switch can be identified the destination of the packet rapidly. As a consequence, according to the second mode for carrying out the invention, packet or packets can be transferred at an extremely high speed. Moreover, in case the subscriber information is read from the subscriber information cache memory 12, the signal processor 11 is no more required to access the database 20. Accordingly, loads to the database 20 can be reduced by providing the subscriber information cache memory 12.

(Third Mode)

The third mode for carrying out the present invention will now be described.

Figure 5:
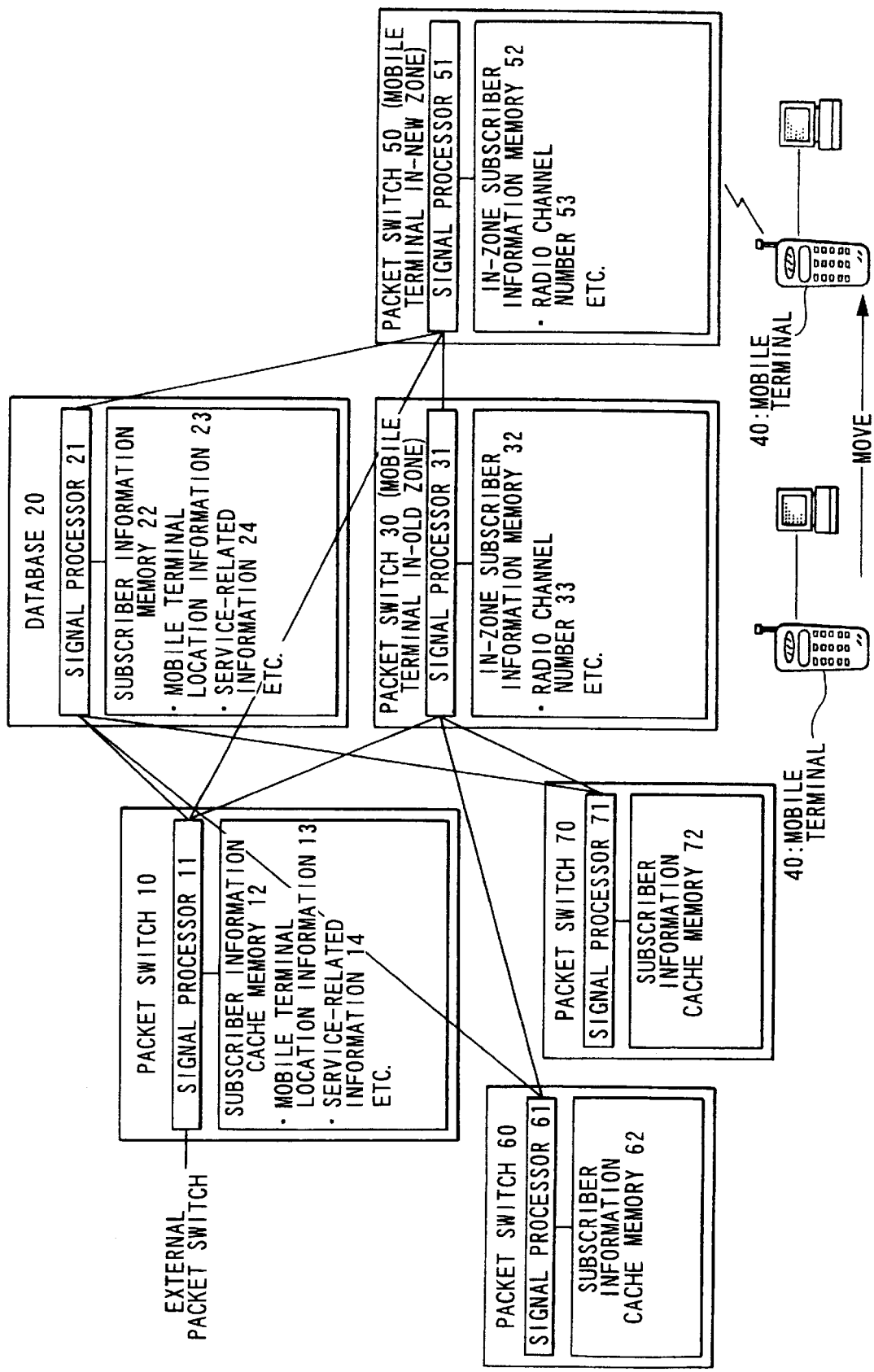
FIG. 5 is a block diagram showing a construction of a packet communication network according to the third mode for carrying out the present invention.
Figure 6:
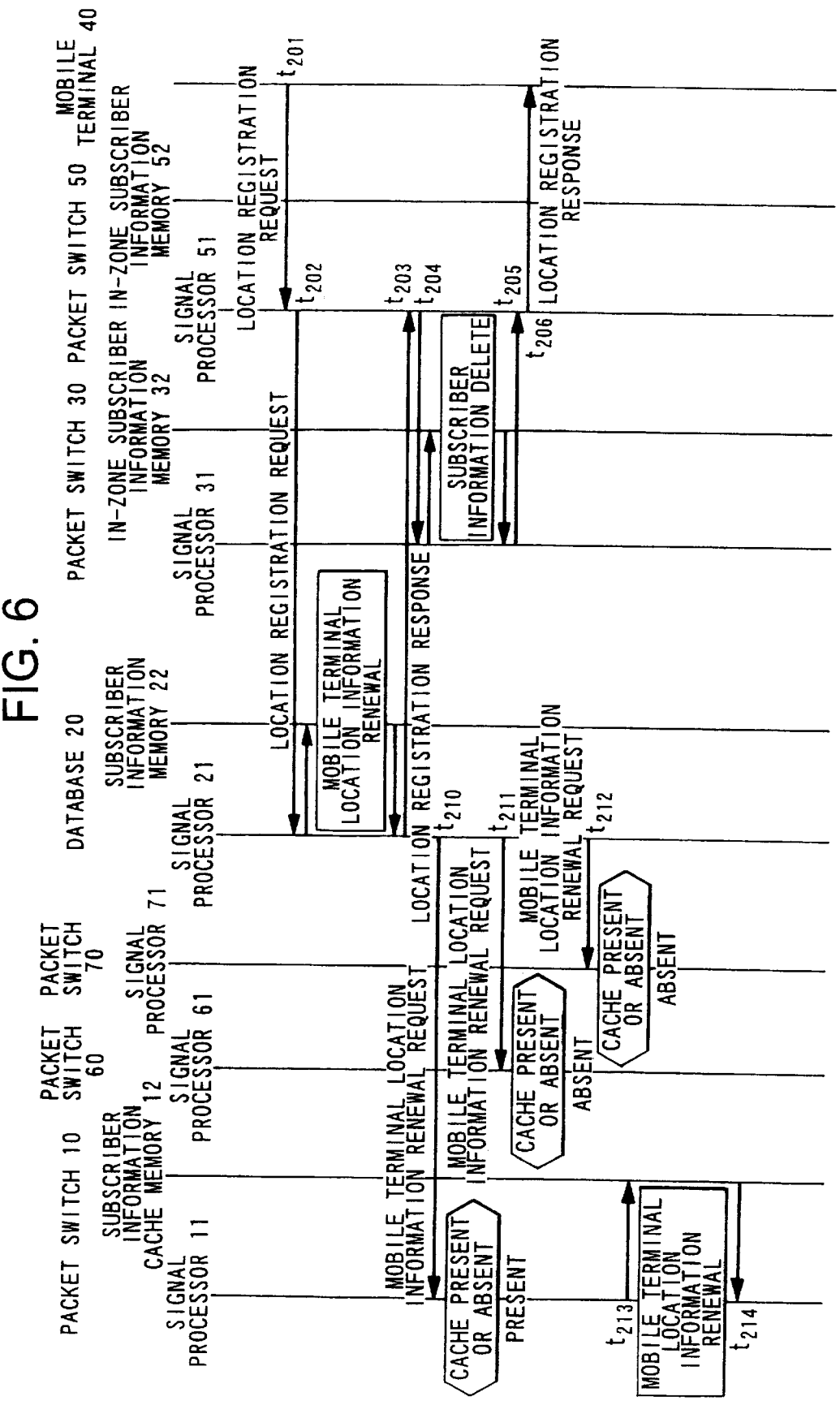
FIG. 6 is a control sequence diagram relating to the third mode for carrying out the invention.

FIGS. 5 and 6 are block diagrams showing a construction of a packet communication network according to the third mode for carrying out the invention. In FIGS. 5 and 6, like parts of FIGS. 1 through 4 are denoted by like reference numerals and description thereof is omitted.

In FIG. 5, reference numeral 50 denotes a packet switch which is construction in the same manner as the packet switch 30. That is, the packet switch 50 includes a signal processor 51 like the signal processor 31, and an in-zone subscriber information memory 52 like the in-zone subscriber information memory 32. That is, the in-zone subscriber information memory 52 stores therein the radio channels used by mobile terminals which are currently located in the zone controlled by the packet switch 50.

Reference numerals 60 and 70 respectively denote packet switches which are constructed in the same manner as the packet switch 10. That is, the packet switches 60 and 70 respectively include signal processors 61 and 71 which are constructed in the same manner as the signal processor 11, and subscriber information cache memories 62 and 72 which are constructed in the same manner as the subscriber information cache memory 12. In this way, the packet switches 10, 60 and 70 have interconnecting functions with external packet switches, while the packet switches 30 and 50 have connecting functions with mobile terminals located in the service area.

Next, operation of the third mode for carrying out the present invention will be described.

Here, the mobile terminal 40 is located in a zone controlled by the packet switch 30 first, and then moves to another zone controlled by the packet switch 50, for example.

First, when the mobile terminal 40 is currently located in the zone controlled by the packet switch 30, the packet switch 30 registers the location of the mobile terminal 40 and renews the location information of the mobile terminal 40 in the database 20. When a packet addressed to the mobile terminal 40 is transferred to the packet switch 10, the subscriber information (namely, location information, service information, etc.) of the mobile terminal 40 is supplied to the signal processor 11 from the database 20.

Then, based on this subscriber information, the packet is transferred from the packet switch 10 to the packet switch 30. When the packets from the second packet on are transferred to the packet switch 10, reference is made to the subscriber information cache memory 12. Then, based on the subscriber information stored in the subscriber information cache memory 12, the packets are rapidly transferred to the packet switch 30. The above-mentioned sequence of procedures are the same as the second mode for carrying out the invention.

The mobile terminal 40 measures the electric field strength level of the peripheral area at the rest of time during which the mobile terminal 40 is not engaged in the job for transferring or receiving the packets. When the mobile terminal 40 moves from the zone controlled by the packet switch 30 to the zone controlled by the packet switch 50, the fact of shifting the zones from one to another is known to the mobile terminal 40 because the electric field strength level of the base station device controlled by the latter is higher than that of the base station device which is controlled by the former. Operation after that will now be described with reference to FIG. 6.

First, when the above-mentioned situation occurs, the mobile station 40 sends a location registration request to the signal processor 51 through a base station device which is currently located in this new zone (time $t_{201}$). This location registration request is transferred to the signal processor 21 (time $t_{202}$). The location information of the mobile terminal 40 is renewed in the database 20. That is, the location information 13 relating to the mobile terminal 40 is rewritten to new one indicating the zone controlled by the packet switch 50 from the old one indicating the zone controlled by the packet switch 30.

Next, the database 20 returns a message to the signal processor 51, informing that the new location of the mobile terminal 40 was registered (time $t_{203}$). At that time, the old zone (zone controlled by the packet switch 30 in the above example) of the mobile terminal 40 is informed to the signal processor 51. Then, upon receipt of this message, the signal processor 51 informs the signal processor 31 about the fact that the mobile terminal 40 is currently located in the new zone controlled by the packet switch 50 (time $t_{204}$).

When this notice is transferred to the signal processor 31, the subscriber information of the mobile terminal 40 stored in the in-zone subscriber information memory 32 is deleted, and this fact is informed to the signal processor 51 from the signal processor 31 (time $t_{205}$). When this notice is received by the signal processor 51, the fact of location registration is informed to the mobile terminal 40 (time $t_{206}$).

On the other hand, in the database 20, after the notice (time $t_{203}$) is sent to the packet switch 50, a mobile terminal location renewal request is sent to the packet switches 10, 60 and 70 which have the subscriber information cache memories respectively (from time $t_{210}$ to time $t_{212}$). That is, since the mobile terminal 40 is located in the new zone controlled by the packet switch 50, a request for renewing the content of each subscriber information cache memory is sent to the mobile terminal 40.

Then, in the signal processors 11, 61 and 71, judgments are made as to whether or not the subscriber information relating to the mobile terminal 40 is stored in the corresponding subscriber information cache memories 12, 62 and 72.

Here, in case the subscriber information of the mobile terminal 40 is stored in the subscriber information cache memory, the location information stored in the subscriber information is renewed. That is, the location information indicates that the mobile terminal 40 is currently located in the new zone controlled by the packet switch 50. In the illustrated example, it is presumed that the subscriber information of the mobile terminal 40 is stored only in the subscriber information cache memory 12 within the packet switch 10, and not stored in the subscriber information cache memories 62 and 72. Accordingly, only the contents of the subscriber information cache memory 12 are renewed (from time $t_{213}$ to time $t_{214}$).

As described above, according to the third mode for carrying out the present invention, when the zone in which the mobile terminal 40 is located is changed, a mobile terminal location information renewal request is sent from the database 20 and the location information within the subscriber information cache memory 12 is renewed. By this, when the packet addressed to the mobile terminal 40 is transferred again to the packet switch 10, this packet can be transmitted to the packet switch 50 which is located in the now location zone.

The signal processors 11, 61 and 71 in the third mode for carrying out the present invention, as noted, made judgment as to whether or not the specific subscriber information is stored in each subscriber information cache memory in accordance with the mobile terminal location information renewal request and renewed the location information when the judgment result is affirmative. However, in this case, the location information stored in the specific subscriber information may be deleted. The reasons are as follows. In an arrangement good for delete, when the packet switch receives the packet addressed to the mobile terminal 40, the judgment result as to whether or not the subscriber information relating to the mobile terminal 40 is stored in the corresponding subscriber information cache memory becomes negative and as a result, the subscriber information is written in the subscriber information cache memory. In the long run, renewal and delete bring about similar effects. That is, the term "renewal" herein used refers not only to renew the subscriber information already stored but also to delete the subscriber information already stored.

(Fourth Mode)

The fourth mode for carrying out the invention according to the present invention will now be described. A hardware construction of the fourth mode is the same as that of the third embodiment (see FIG. 5). A control sequence for performing a packet communication through the packet switches 10 and 30 when the mobile terminal 40 is located in the zone controlled by the packet switch 30 is similar to that of the second mode (see FIG. 4) for carrying out the present invention.

Figure 7:
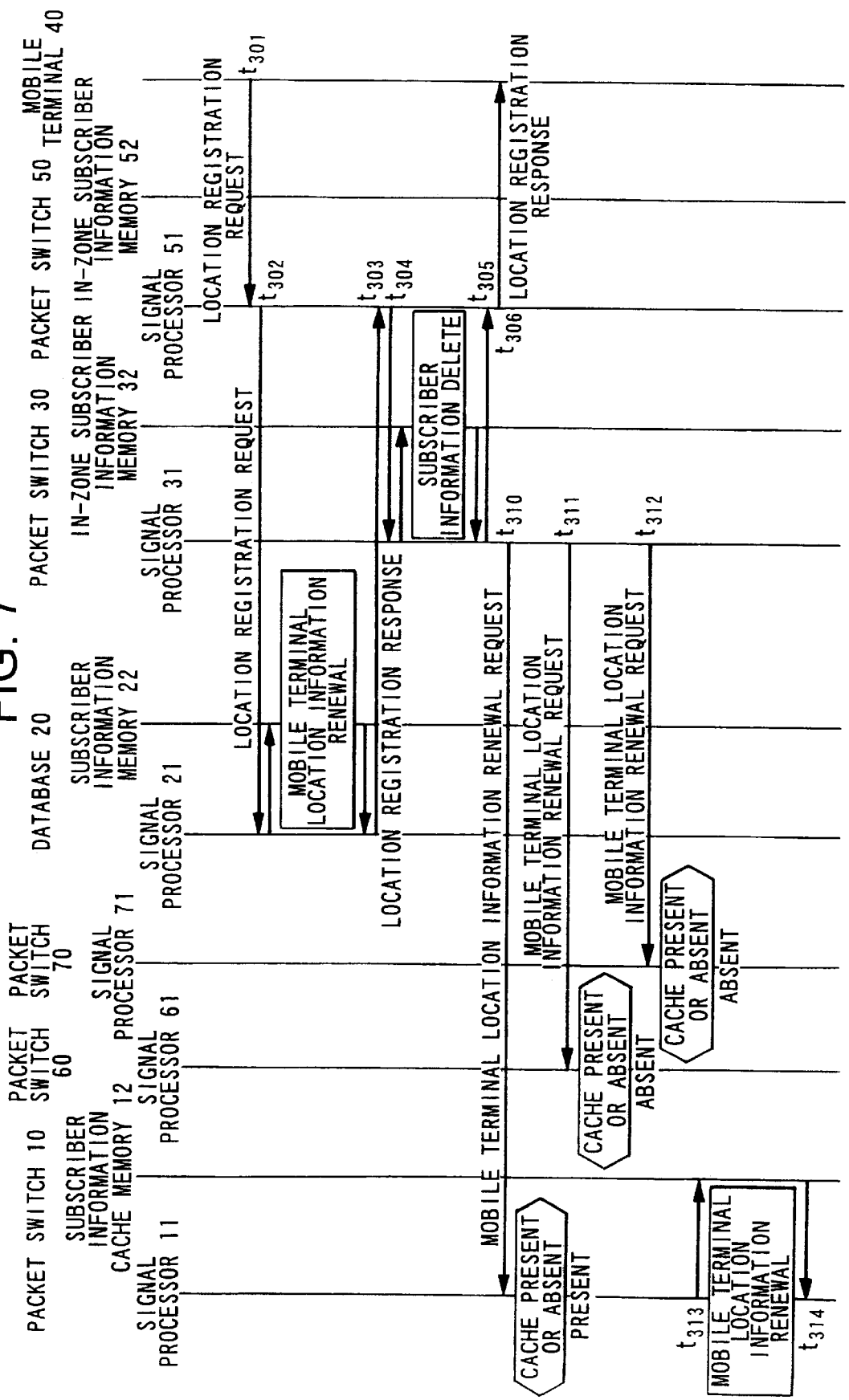
FIG. 7 is a control sequence diagram of a packet communication network according to the fourth mode for carrying out the present invention.

Next, a control sequence after the mobile terminal 40 moves to the zone controlled by the packet switch 50 will be described with reference to FIG. 7. In this illustration, a location registration request is sent to the signal processor 51 from the mobile terminal 40, and this location registration request is transmitted to the signal processor 21 (time $t_{302}$) In the database 20, the location information of the mobile terminal 40 is renewed and the fact of completion of the location registration is notified (time $t_{303}$). Then, upon receipt of this notice, the signal processor 51 informs the signal processor 31 that the mobile terminal 40 is currently located in the new zone controlled by the packet switch 50 (time $t_{304}$).

On the other hand, the subscriber information of the mobile terminal 40 in the in-zone subscriber information memory 32 is deleted and this fact is notified to the signal processor 51 from the signal processor 31 (time $t_{305}$). Upon receipt of this notice, the signal processor 51 notifies the mobile terminal 40 of the completion of the location registration (time $t_{306}$). The procedures for time $t_{301}$ to $t_{306}$ hereinbefore described is the same as those for time $t_{201}$ to $t_{206}$ in the third mode for carrying out the invention.

However, the fourth mode is different from the third mode in the respect that the mobile terminal location information renewal request is sent not from the database but from the signal processor 31. That is, in the illustrated example, at time $t_{310}$ to $t_{312}$, the mobile terminal location information renewal request is sent to the packet switches 10, 60 and 70, and during the time period from time $t_{313}$ to $t_{314}$, the contents of the subscriber information cache memory 12 are renewed.

In this way, according to the fourth mode, since the mobile terminal location information renewal request is sent by the packet switch 30, etc., it is not necessary for the database 20 to send the request. In other words, since the work load relating to the output of the mobile terminal location information renewal request is dispersed to the packet switches 30 and 50, etc., the work load of the database 20 is reduced.

The signal processors 11, 61 and 71 in the fourth mode for carrying out the present invention, as noted, made judgment as to whether or not the specific subscriber information is stored in each subscriber information cache memory in accordance with the mobile terminal location information renewal request and renewed the location information when the judgment result is affirmative. However, the location information stored in the specific subscriber information may be deleted as in the case with the third mode.

(Fifth Mode)

Next, the fifth mode for carrying out the present invention will be described.

Figure 8:
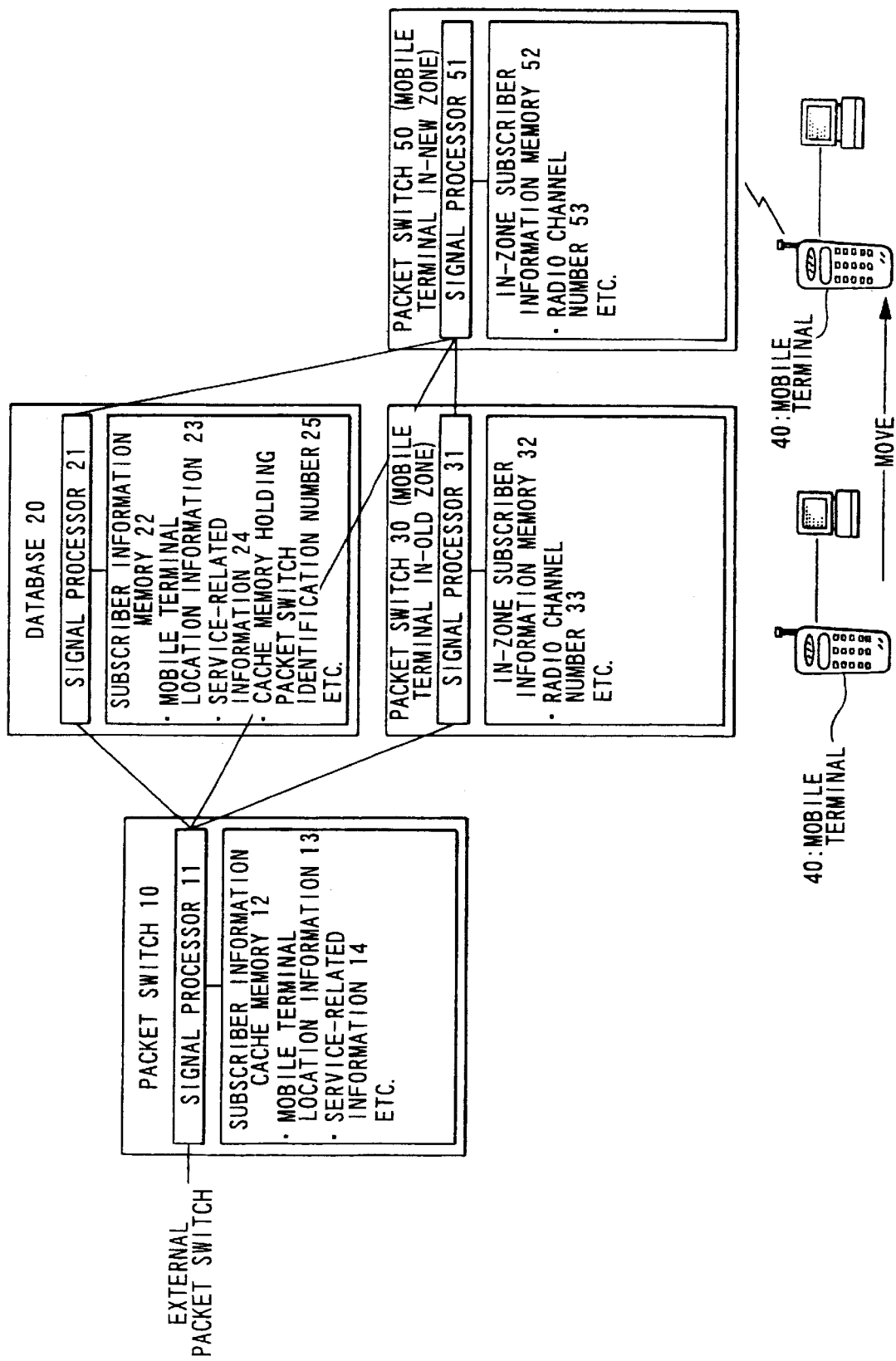
FIG. 8 is a block diagram showing a construction of a packet communication network according to the fifth mode for carrying out the present invention.

A hardware construction of this fifth mode is shown in FIG. 8. It should be noted that the construction of this illustration is similar to that of the third mode (see FIG. 5). However, since the packet switches 60 and 70 have nothing to do directly with the procedure to be described hereinafter, these two component parts are not shown. In this fifth mode, the control sequence for performing a packet communication through the packet switches 10 and 30 when the mobile terminal 40 is located in the zone controlled by the packet switch 30 is almost similar to that of the second mode (see FIG. 4) for carrying out the present invention.

However, at time $t_{103}$ of FIG. 4, the requested subscriber information is returned to the packet switch as a requester and in addition, the identification number of the packet switch that send the subscriber information read request command is added to the subscriber information memory 22. Accordingly, in the illustrated example, the identification number of the packet switch 10 is added to the subscriber information memory 22. This identification number is hereinafter referred to as "cache memory holding packet switch identification number 25". In the illustrated example, since the mobile terminal 40 subscriber information read request command is output only from the packet switch 10, the identification number 25 is related only to the packet switch 10. In case a plurality of switches send the commands for requesting to read the subscriber information of the mobile terminal 40, the identification numbers of those switches are included in the subscriber information memory 22.

Figure 9:
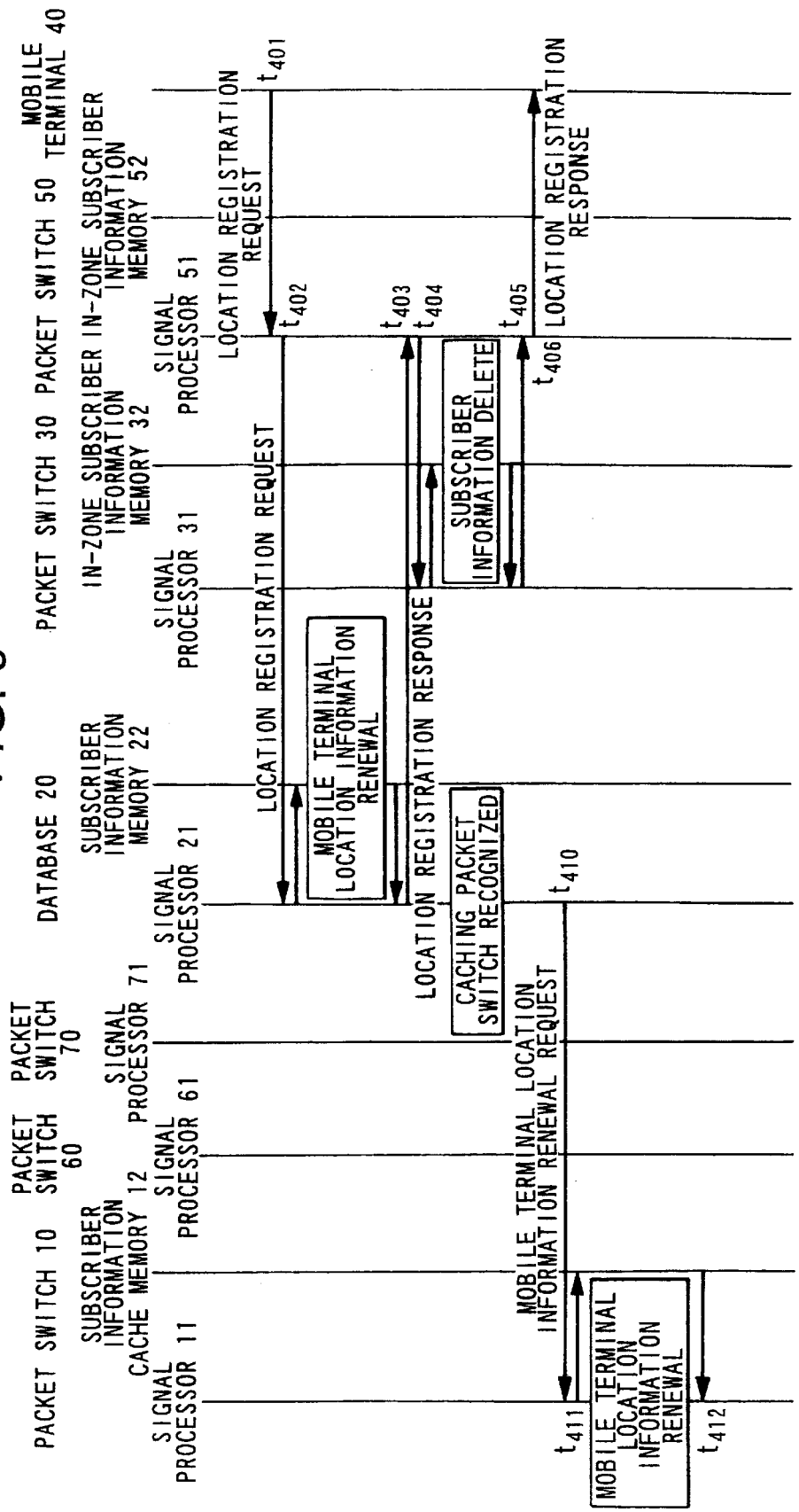
FIG. 9 is a control sequence diagram relating to the fifth mode for carrying out the invention.

Next, a control sequence after the mobile terminal 40 moves to the zone controlled by the packet switch 50 will be described with reference to FIG. 9. In this illustration, a location registration request is sent to the signal processor 51 from the mobile terminal 40 at time $t_{401}$, and this location registration request is transmitted to the signal processor 21 (time $t_{402}$) In the database 20, the location information of the mobile terminal 40 is renewed and this fact is returned (time $t_{403}$). Then, upon receipt of this notice, the signal processor 51 informs the signal processor 31 that the mobile terminal 40 is currently located in the new zone controlled by the packet switch 50 (time $t_{404}$).

On the other hand, the subscriber information of the mobile terminal 40 in the in-zone subscriber information memory 32 is deleted and this fact is notified to the signal processor 51 from the signal processor 31 (time $t_{405}$). Upon receipt of this notice, the signal processor 51 notifies the mobile terminal 40 of the completion of the location registration (time $t_{406}$). The procedures for time $t_{401}$ to $t_{406}$ hereinbefore described is the same as those for time $t_{201}$ to $t_{206}$ in the third mode for carrying out the invention.

However, the fifth mode is different from the third mode in operation of the signal processor 21 afterwards from time $t_{403}$. That is, the signal processor 21 searches the subscriber information of the mobile terminal whose location information is renewed and reads the cache memory holding packet switch identification number 25 from the subscriber information memory 22. Then, at time $t_{410}$, the mobile terminal location information renewal request is sent to the packet switches (only the packet switch 10 in the illustrated example) included in the identification number 25. On the other hand, in the packet switch 10, the location information in the subscriber information cache memory 12 is changed (time $t_{411}$ to $t_{412}$) to new one (one corresponding to the packet switch 50).

In this way, according to the fifth mode, since the identification number of the packet switch, which output the read request command, is added to the subscriber information memory 22 and the mobile terminal location information renewal request is output only to the packet switch indicated by the identification number, the frequency for the database 20 to send the renewal request is reduced and the packet switch having the subscriber information cache memory does not receive a renewal request which has nothing to do with its own machine. As a consequence, the work loads of the database 20 and the respective packet switches are reduced and the traffics on the network are also reduced.

The signal processor 11 in the fifth mode makes a judgment as to whether or not the specific subscriber information is stored in each subscriber information cache memory in accordance with the mobile terminal location information renewal request and renews the location information included in the specific subscriber information when the judgment result is affirmative. However, the location information may be deleted as in the case with the third and fourth modes for carrying out the invention.

(Sixth Mode)

Next, the sixth mode for carrying out the present invention will now be described.

Figure 10:
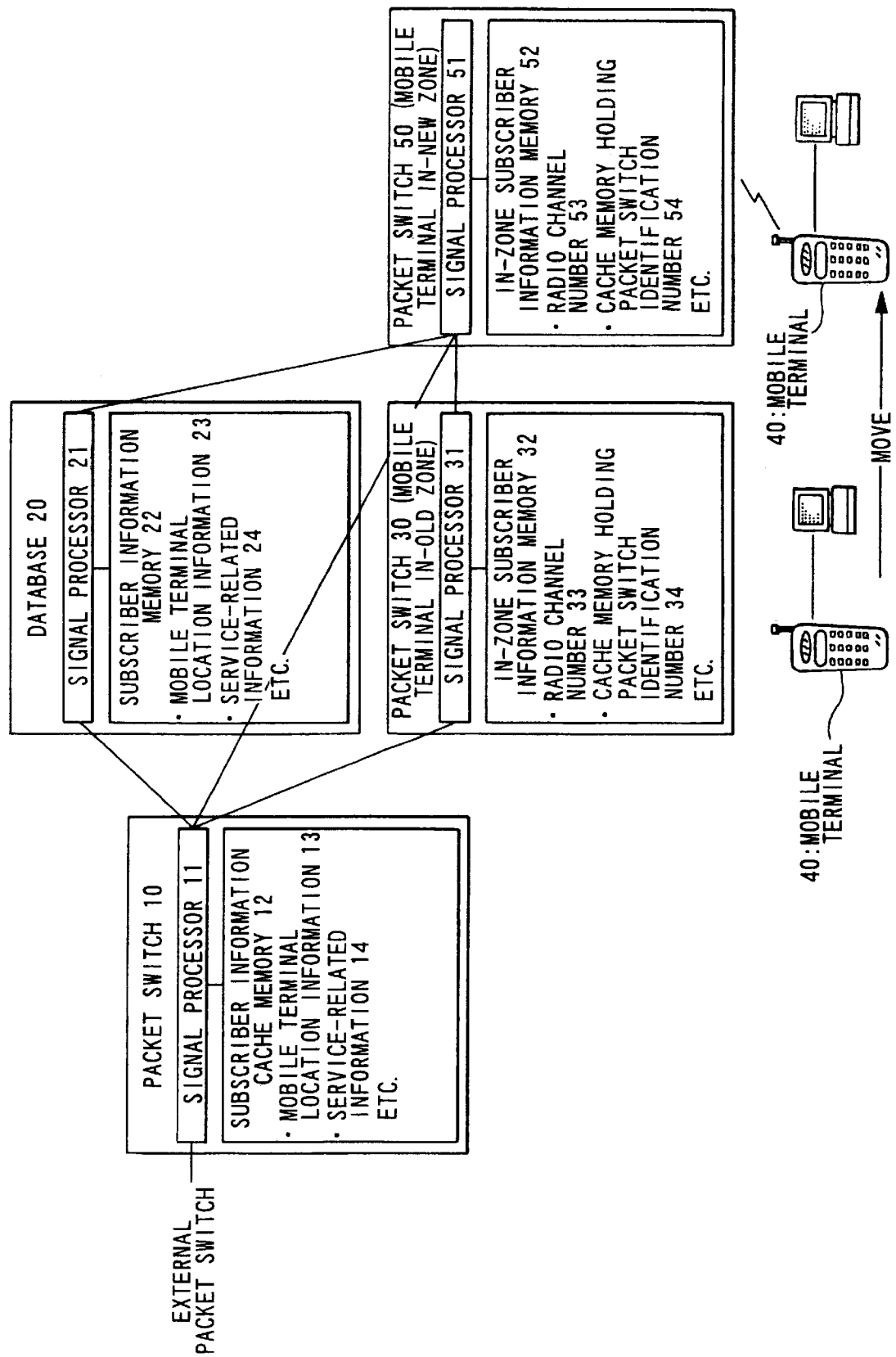
FIG. 10 is a block diagram showing a construction of a packet communication network according to the sixth embodiment of the present invention.

A hardware construction of this sixth mode is shown in FIG. 10. It should be noted that the construction of this illustration is similar to those of the third and fifth modes (see FIGS. 5 and 8). However, since the packet switches 60 and 70 have nothing to do directly with the procedure to be described hereinafter, these two component parts are not shown. In this sixth mode, the control sequence for performing a packet communication through the packet switches 10 and 30 when the mobile terminal 40 is located in the zone controlled by the packet switch 30 is almost similar to that of the second mode (see FIG. 4) for carrying out the present invention.

However, at time $t_{106}$, the packet addressed to the mobile terminal 40 is transferred to the packet switch 30 and the identification number of the packet switch of the transfer side is added to the in-zone subscriber information memory 32 in the packet switch 30. Accordingly, in the illustrated example, the identification number of the packet switch 10 is added to the in-zone subscriber information memory 32. This identification number is hereinafter referred to as "cache memory holding packet switch identification number 34". In the illustrated example, the packet addressed to the mobile terminal 40 is sent only from the packet switch 10 and therefore, the identification number 34 relates only to the packet switch 10. In case a plurality of switches transfer packets to the mobile terminal 40, the identification numbers of the switches are included in the in-zone subscriber information memory 32.

Figure 11:
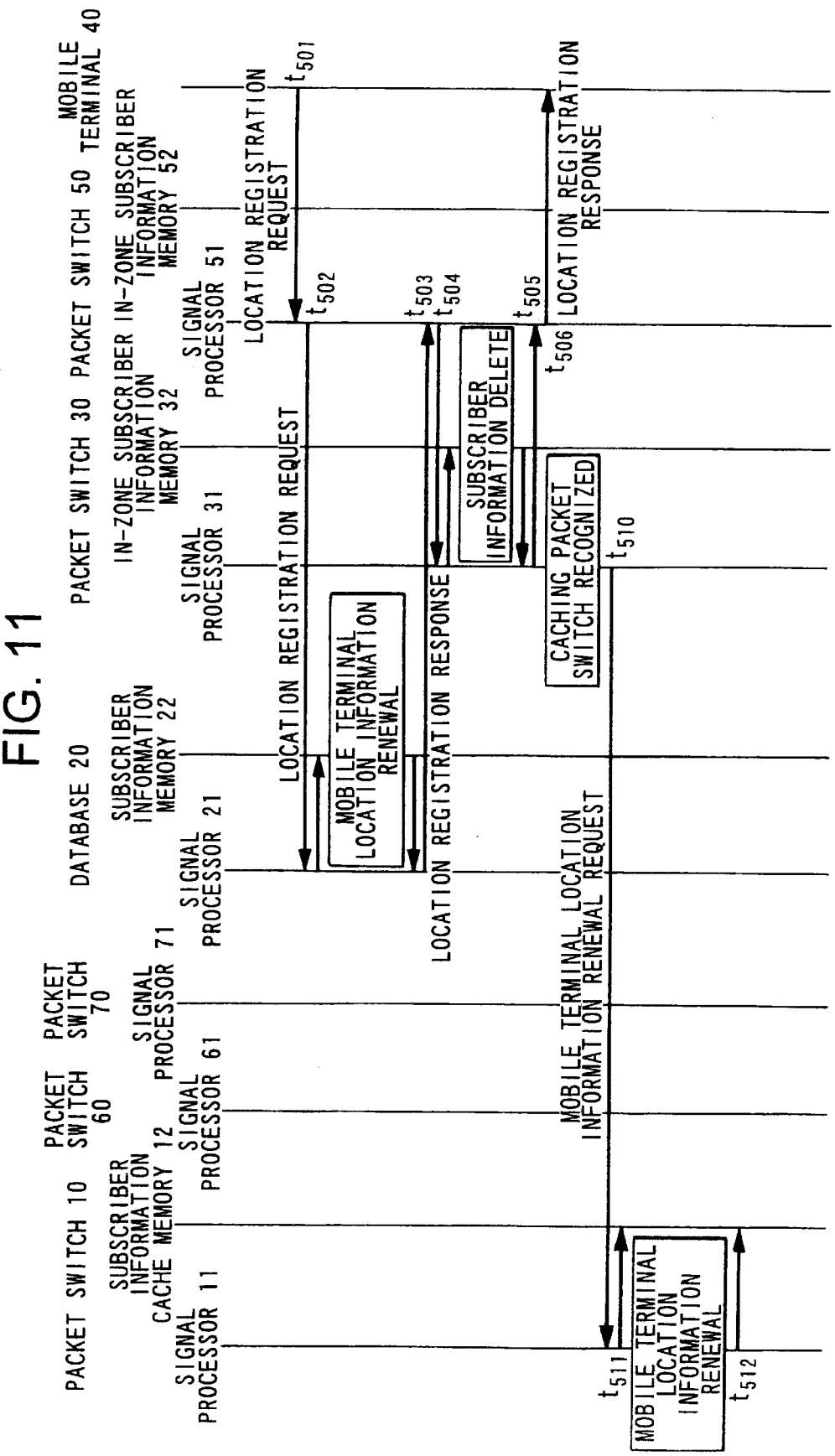
FIG. 11 is a control sequence diagram relating to the sixth mode for carrying out the invention.

Next, a control sequence after the mobile terminal 40 moves to the zone controlled by the packet switch 50 will be described with reference to FIG. 11. In this illustration, a location registration request is sent to the signal processor 51 from the mobile terminal 40 at time $t_{501}$, and this location registration request is transmitted to the signal processor 21 (time $t_{502}$). In the database 20, the location information of the mobile terminal 40 is renewed and this fact is returned (time $t_{503}$). Then, upon receipt of this notice, the signal processor 51 informs the signal processor 31 that the mobile terminal 40 is currently located in the new zone controlled by the packet switch 50 (time $t_{504}$).

On the other hand, the subscriber information of the mobile terminal 40 in the in-zone subscriber information memory 32 is deleted and this fact is notified to the signal processor 51 from the signal processor 31 (time $t_{505}$). Upon receipt of this notice, the signal processor 51 notifies the mobile terminal 40 of the completion of the location registration (time $t_{506}$) The procedures for time $t_{501}$ to $t_{506}$ hereinbefore described is the same as those for time $t_{401}$ to $t_{406}$ in the fifth mode for carrying out the invention.

However, the sixth mode is different from the fifth mode in the respect that the mobile terminal location information renewal request is sent not from the database 20 but from the signal processor 31. That is, in the illustrated example, the identification number 34 in the in-zone subscriber information memory 32 is searched during the time period from time $t_{505}$ to $t_{510}$. Then, at time $t_{510}$, the mobile terminal location information renewal request is sent to the packet switches (only the packet switch 10 in the illustrated example) included in the identification number 25.

On the other hand, in the packet switch 10, the location information in the subscriber information cache memory 12 is changed (time $t_{511}$ to $t_{512}$) to new one (one corresponding to the packet switch 50). In this way, according to the sixth mode, since the mobile terminal location information renewal request is sent by packet switch 30, etc., it is not necessary for the database 20 for outputting the specific request. In other words, since the work load relating to the output of the mobile terminal location information renewal request is dispersed to the packet switches 30 and 50, etc., the work load of the database 20 is reduced and the traffics on the network can be reduced, too.

The signal processor 11 in the sixth mode makes a judgment as to whether or not the specific subscriber information is stored in each subscriber information cache memory in accordance with the mobile terminal location information renewal request and renews the location information included in the specific subscriber information when the judgment result is affirmative. However, the location information may be deleted as in the case with the third and fifth modes for carrying out the invention.

(Seventh Mode)

Next, the Seventh Mode for carrying out the present invention will be described.

First, in the above-mentioned third to sixth modes for carrying out the present invention, when the mobile terminal 40 moves to the zone controlled by the packet switch 50, the mobile terminal location renewal request is sent to the packet switch from the database 20 or the packet switch device 30. Based on this request, the location information relating to the mobile terminal 40 in the subscriber cache memory 12 is renewed. Here, if it is presumed that the mobile terminal location information renewal request is not output from the database 20 or the packet switch 30, the packet switch 10 transfers the packet to the packet switch 30 based on a wrong location information.

However, even in that case, only if the packet switch 10 can recognized that the location information is wrong, the packet switch 10 can read out the correct location information from the database 20. In this seventh mode for carrying out the invention, it is designed such that the packet is correctly transmitted to the mobile terminal 40 via the above-mentioned processes. The details are described hereinafter.

A hardware construction of the seventh mode for carrying the present invention is similar to that of the third embodiment (see FIG. 5). The control sequence for performing a packet communication through the packet switches 10 and 30 when the mobile terminal 40 is located in the zone controlled by the packet switch 30 is similar to that of the second mode (see FIG. 4) for carrying out the present invention. Next, a control sequence after the mobile terminal 40 goes to the zone controlled by the packet switch 50 will be described with reference FIG. 12.

Figure 12:
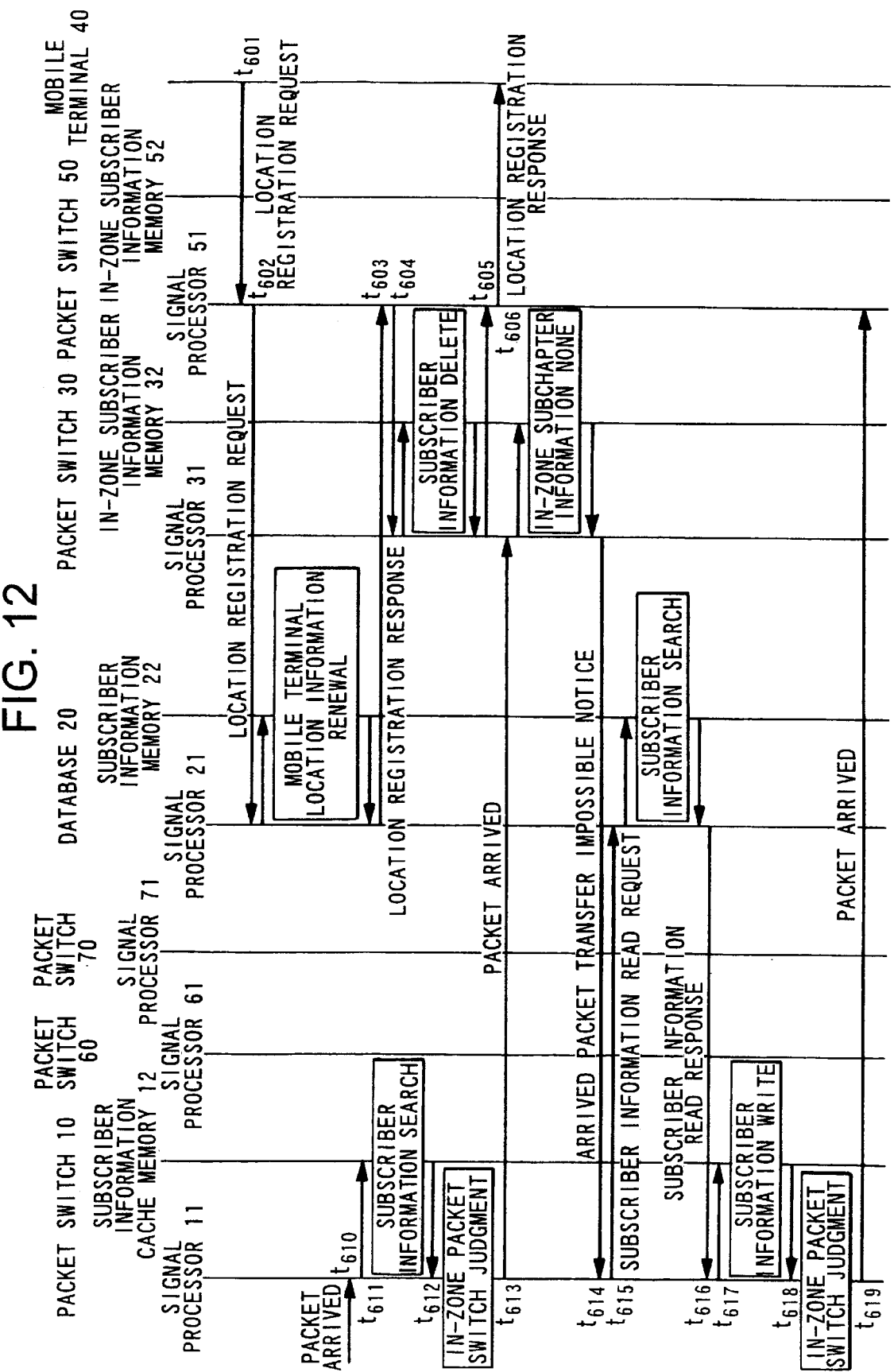
FIG. 12 is a control sequence diagram of a packet communication network according to the seventh mode for carrying out the present invention.

In FIG. 12, at time $t_{601}$, the location registration request is sent to the signal processor 51 from the mobile terminal 40 and this request is transferred to the signal processor 21 (time $t_{602}$). In the database 20, the location information of the mobile terminal 40 is renewed and this fact is informed (time $t_{603}$). Upon receipt of the notice, the signal processor 51 informs the signal processor 31 that the mobile terminal 40 is currently located in a new zone controlled by the packet switch 50 (time $t_{604}$).

On the other hand, the subscriber information of the mobile terminal 40 stored in the in-zone subscriber information memory 32 is deleted and this fact is informed to the signal processor 51 from the signal processor 31 (time $t_{605}$). Upon receipt of the notice, the signal processor 51 notices the mobile terminal 40 that the location registration is performed. The procedures at time $t_{601}$ to $t_{606}$ hereinbefore described are similar to those at time $t_{201}$ to $t_{206}$ in the third mode for carrying out the present invention. However, the signal processor 21 in this seventh mode does not output the mobile terminal location information renewal requests to the respective packet switches 10, 60 and 70 after it made the response (at time $t_{603}$) to the signal processor 51.

Next, at time $t_{610}$, the packet addressed to the mobile terminal 40 is transferred to the signal processor 11. On the other hand, during a time period from time $t_{611}$ to $t_{612}$, the subscriber information of the mobile terminal 40 in the cache memory 12 is searched. Next, based on the location information in the subscriber information thus searched, the destination packet switch is judged. In the above-mentioned example, it is judged such that the packet switch 30 which the mobile terminal 40 was located, is the destination packet switch. Thus, at time $t_{613}$, the packet is transferred from the packet switch 10 to the packet switch 30. On the other hand, although the signal processor 31 attempts to search the subscriber information of the mobile terminal 40 from the in-zone subscriber information memory 32, the subscriber information is already deleted (during the time period from time $t_{604}$ to $t_{605}$).

Therefore, the signal processor 31 sends a notice to the signal processor 11 informing that the packet transfer is impossible (time $t_{614}$). Upon receipt of this notice, the signal processor 11 outputs a read request command for reading the subscriber information of the mobile terminal 40 to the signal processor 21 of the database 20. On the other hand, the database 20 sends (time $t_{616}$) a subscriber information of the mobile terminal 40 to the signal switch 11. The location information in the subscriber information is already renewed to new one relating to the zone controlled by the packet switch 50 (during the time period from time $t_{602}$ to time $t_{603}$).

Next, the subscriber information in the subscriber information cache memory is rewritten to the returned one (time $t_{617}$ to $t_{618}$). Then, based on the location information of the rewritten subscriber information, that is, the location information corresponding the packet switch 50, the packet transferred before is transferred to the signal processor 51 of the packet switch 50.

As mentioned in the foregoing, according to the seventh mode for carrying out the present invention, the mobile terminal location information renewal request (or delete request, the same is applicable hereinafter) is not sent to the packet switch 10 by the database 20 or the packet switch 30. Accordingly, the location information in the subscriber information cache memory 12 is rewritten when actual necessity arises. Owing to this arrangement, the frequency of rewriting of the location information in the subscriber information cache memory 21 can be reduced.

(Eighth Mode)

Next, the eighth mode for carrying out the present invention will be described.

First, in the above-mentioned third to sixth modes for carrying out the invention, the mobile terminal location information renewal request is sent from the database 20 or the packet switch 30 to the packet switch 10. Based on this request, the location information relating to the mobile terminal 40 in the subscriber information cache memory 12 is renewed. However, there are possibilities that the next packet is transferred to the packet switch 10 by one reason or others before the mobile terminal location information renewal request is supplied to the packet switch 10.

The above unfavorable possibilities include, for example, those cases where the work loads are temporarily increased in the database 20 or the packet switch 30 and the output of the mobile terminal location information renewal request is delayed, and communication trouble occurs. When one of such cases occurs, the packet is transferred to the packet switch 30 irrespective of the fact that the mobile terminal 40 is located in the zone controlled by the packet switch 30. The eighth mode is worked out in order to transfer the packet normally to the mobile terminal 40 under such an unfavorable condition. The details will be described below.

A hardware construction of the eighth mode is similar to that of the third mode (see FIG. 5). Also, a control sequence for performing a packet communication through the packet switches 10 and 30 when the mobile terminal 40 is located in the zone controlled by the packet switch 30 is similar to that of the second mode (see FIG. 4) for carrying out the present invention. A control sequence after the mobile terminal 40 moves to the zone controlled by the packet switch 50 will be described with reference to FIG. 12.

In FIG. 12, at time $t_{60}1$, the mobile terminal 40 sends the location registration request to the signal processor 51 and this request is transferred to the signal processor 21 (time $t_{602}$). In the database 20, the location information of the mobile terminal 40 is renewed and a notice informing a completion of the location registration is sent (time $t_{603}$). Upon receipt of this notice, the signal processor 51 notifies the signal processor 31 that the mobile terminal 40 is currently located in the zone controlled by the packet switch 50 (time $t_{604}$).

On the other hand, the subscriber information of the mobile terminal 40 in the in-zone subscriber information memory 32 is deleted and this fact is sent to the signal processor 51 (time $t_{605}$). When the signal processor 51 receives this notice, a notice informing the completion of location registration is sent (time $t_{606}$). The procedures at time $t_{601}$ to $t_{606}$ hereinbefore described are similar to those at time $t_{201}$ to $t_{206}$ in the third mode. Furthermore, after sending (time $t_{603}$) the response about the location registration to the signal processor 51, the signal processor 21 outputs the mobile terminal location information renewal requests to the respective packet switches 10, 60 and 70.

Here, the procedures to be performed when the mobile terminal location information renewal request arrives at the packet switch 10 before the next packet addressed to the mobile terminal 40 are the same as the third mode. That is, the location information in the subscriber information cache memory 12 is renewed based on the request (see time $t_{213}$ to $t_{214}$ of FIG. 6). Thereafter, the packet addressed to the mobile terminal 40 is transferred to the packet switch 50.

On the other hand, the procedures to be performed when the next packet addressed to the mobile terminal 40 arrives at the packet switch 10 before the mobile terminal location information renewal request is output from the database 20 are similar to those of the seventh mode. That is, when the packet addressed to the mobile terminal 40 is transferred to the signal processor 11 at time $t_{610}$, the subscriber information of the mobile terminal 40 is searched (time $t_{611}$ to $t_{612}$) in the subscriber information cache memory 12.

Then, based on the wrong location information, the packet is transferred to the packet switch 30 in the old zone (time $t_{613}$). Accordingly, the signal processor 31 informs the signal processor 11 that the packet transfer is impossible (time $t_{614}$). Upon receipt of this notice, the signal processor 11 reads (time $t_{616}$) the subscriber information of the mobile terminal 40 from the database 20 and renews (time $t_{617}$ to $t_{618}$) the subscriber information in the subscriber information cache memory 12. Subsequently, based on the location information of the renewed subscriber information, that is, based on the location information corresponding to the packet switch 50, the packet transferred before is transferred to the signal processor 51 of the packet switch 50.

As described in the foregoing, according to the eighth mode for carrying out the invention, when the packet switch, which received the transferred packet, makes a notice that the packet transfer is impossible, the packet switch which transferred the packet refers to the database 20. Then, correct location information is written in the subscriber information cache memory 12 and the packet is transferred again to the packet switch based on the correct location information. As a consequence, even in such an incidence wherein the transmittance of the mobile terminal location information renewal request is delayed or accidentally failed, the packet can be reliably transferred to the correct destination.

(Modified Embodiment)

The present invention is not limited to the above-mentioned embodiments. For example, various modifications can be made as follows.

(1) In the eighth mode, the procedures to be performed when the mobile terminal location information renewal request arrived at the packet switch 10 before the next packet addressed to the mobile terminal 40 arrives are the same as the third mode. However, it goes without saying that such procedures are carried out in the same as the fourth to sixth modes.

(2) In the third to eighth modes, the subscriber information of the mobile terminal 40 in the in-zone subscriber information memory 32 is deleted and a notice of this fact is sent from the signal processor 31 to the signal processor 51 (time $t_{205}$, $t_{305}$, $t_{405}$, $t_{505}$ and $t_{605}$). At that time, the deleted subscriber information is transferred from the packet switch 30 to the packet switch 50 so that the packet switch 50 can maintain the er information.

We claim:

1. A packet transfer scheme used in a mobile communication system comprising a database for storing an identification number of a mobile terminal and location information showing a zone in which said mobile terminal is currently located, and for rewriting said location information in accordance with a request from said mobile terminal, a plurality of first packet switches, each having a temporary storage means with a higher access speed than said database, a second packet switch capable of communicating with said mobile terminal in case said mobile terminal is located in a given zone, said packet transfer scheme being characterized in that:

each of said first packet switches inquires of said database about the location information when it receives a packet addressed to said mobile terminal;

said database provides each of said first packet switches with the location information in response to said inquiry;

each of said first packet switches writes the location information provided from said database into its respective temporary storage means, and when said location information indicates said given zone, transfers said packet to said second packet switch, and when said packet addressed to said mobile terminal is received again after the initial reception of said packet, reads said location information from its temporary storage means and transfers said re-received packet to said second packet switch;

said second packet switch transfers said packet to said mobile terminal when said second packet switch receives said packet from one of said first packet switches;

said database requests each of said first packet switches to rewrite said location information when said location information is rewritten in said database; and each of said first packet switches renews its respective location information when said location information is stored in its corresponding temporary storage means.

2. A packet transfer scheme used in a mobile communication system comprising a database for storing an identification number of a mobile terminal and location information showing a zone in which said mobile terminal is currently located, and for rewriting said location information in accordance with a request from said mobile terminal, a plurality of first packet switches, each having a temporary storage means with a higher access speed than said database, a second packet switch capable of communicating with said mobile terminal in case said mobile terminal is located in a given zone, said packet transfer scheme being characterized in that:

each of said first packet switches inquires of said database about the location information when it receives a packet addressed to said mobile terminal;

said database provides each of said first packet switches with the location information in response to said inquiry;

each of said first packet switches writes the location information provided from said database into its respective temporary storage means, and when said location information indicates said given zone, transfers said packet to said second packet switch, and when said packet addressed to said mobile terminal is received again after the initial reception of said packet, reads said location information from its temporary storage means and transfers said re-received packet to said second packet switch;

said second packet switch transfers said packet to said mobile terminal when said second packet switch receives said packet from one of said first packet switches;

said second packet switch requests each of said first packet switches to rewrite said location information when said location information is rewritten in said database; and each of said first packet switches renews its respective location information when said location information is stored in its corresponding temporary storage means.

3. A packet transfer scheme used in a mobile communication system comprising a database for storing an identification number of a mobile terminal and location information showing a zone in which said mobile terminal is currently located, and for rewriting said location information in accordance with a request from said mobile terminal, a plurality of first packet switches, each having a corresponding temporary storage means with a higher access speed than said database a second packet switch capable of communicating with said mobile terminal in case said mobile terminal is located in a given zone, said packet transfer scheme being characterized in that:

each of said first packet switches inquires of said database about the location information when it receives a packet addressed to said mobile terminal;

said database provides each of said first packet switches with the location information in response to said inquiry;

each of said first packet switches writes the location information provided from said database into its corresponding temporary storage means, and when said location information indicates said given zone, transfers said packet to said second packet switch, and when said packet addressed to said mobile terminal is received again after the initial reception of said packet, reads said location information from its corresponding temporary storage means and transfers said re-received packet to said second packet switch;

said second packet switch transfers said packet to said mobile terminal when said second packet switch receives said packet from one of said first packet switches;

said database requests each of said first packet switches which previously stored said location information in its corresponding temporary storage means, to rewrite said location information when said location information is rewritten in said database; and each of said first packet switches, which received the rewrite request, renews its respective location information stored in its corresponding temporary storage means.

4. A packet transfer scheme used in a mobile communication system comprising a database for storing an identification number of a mobile terminal and location information showing a zone in which said mobile terminal is currently located, and for rewriting said location information in accordance with a request from said mobile terminal, a plurality of first packet switches, each having a corresponding temporary storage means with a higher access speed than said database, a second packet switch capable of communicating with said mobile terminal in case said mobile terminal is located in a given zone, said packet transfer scheme being characterized in that:

each of said first packet switches inquires of said database about the location information when it receives a packet addressed to said mobile terminal;

said database provides each of said first packet switches with the location information in response to said inquiry;

each of said first packet switches writes the location information provided from said database into its corresponding temporary storage means, and when said location information indicates said given zone, transfers said packet to said second packet switch, and when said packet addressed to said mobile terminal is received again after the initial reception of said packet, reads said location information from its corresponding temporary storage means and transfers said re-received packet to said second packet switch;

said second Packet switch transfers said packet to said mobile terminal when said second packet switch receives said packet from one of said first packet switches;

said second packet switch requests each of said first packet switches which previously stored said location information in its corresponding temporary storage means, to rewrite said location information when said location information is rewritten in said database; and each of said first packet switches, which received the rewrite request, renews its respective location information stored in its corresponding temporary storage means.

5. A packet transfer scheme used in a mobile communication system comprising a database for storing an identification number of a mobile terminal and location information showing a zone in which said mobile terminal is currently located, and for rewriting said location information in accordance with a request from said mobile terminal, a plurality of first packet switches, each having a corresponding temporary storage means with a higher access speed than said database, a second packet switch capable of communicating with said mobile terminal in case said mobile terminal is located in a given zone, said packet transfer scheme being characterized in that:

each of said first packet switches inquires of said database about the location information when it receives a packet addressed to said mobile terminal;

said database provides each of said first packet switches with the location information in response to said inquiry;

each of said first packet switches writes the location information provided from said database into its corresponding temporary storage means, and when said location information indicates said given zone, transfers said packet to said second packet switch, and when said packet addressed to said mobile terminal is received again after the initial reception of said packet, reads said location information from its corresponding temporary storage means and transfers said re-received packet to said second packet switch;

said second packet switch transfers said packet to said mobile terminal when said second packet switch receives said packet from one of said first packet switches;

said second packet switch sends a transfer impossible notice to said one of said first packet switches informing that a transfer of said packet is impossible to perform when said packet is transferred again from said one of said first packet switches after said mobile terminal moves outside said given zone;

said one of said first packet switches, upon receipt of said transfer impossible notice, inquires of said database about a new location information of said mobile terminal;

said database provides said one of said first packet switches with said new location information in response to said inquiry; and said one of said first packet switches writes said new location information in its corresponding temporary storage means upon receipt of said new location information from said database.

6. The packet transfer scheme according to one of claims 1 through 4, characterized in that:

when said second packet switch receives said packet again from said one of said first packet switches before said one of said first packet switches receives said location information rewrite request from said database or said second packet switch, said second packet switch sends a transfer impossible notice to said one of said first packet switches informing that a transfer of said packet is impossible to perform;

said one of said first packet switches inquires of said database about said new location information of said mobile terminal upon receipt of said transfer impossible notice;

said database provides said one of said first packet switches with said new location information in response to said inquiry; and said one of said first packet switches writes said new location information in said temporary storage means upon receipt of said new location information from said database.

* * * * *